Aug. 3, 1965  R. P. ALER  3,198,233
WHEEL TRACTION AID DEVICE
Filed Feb. 1, 1963
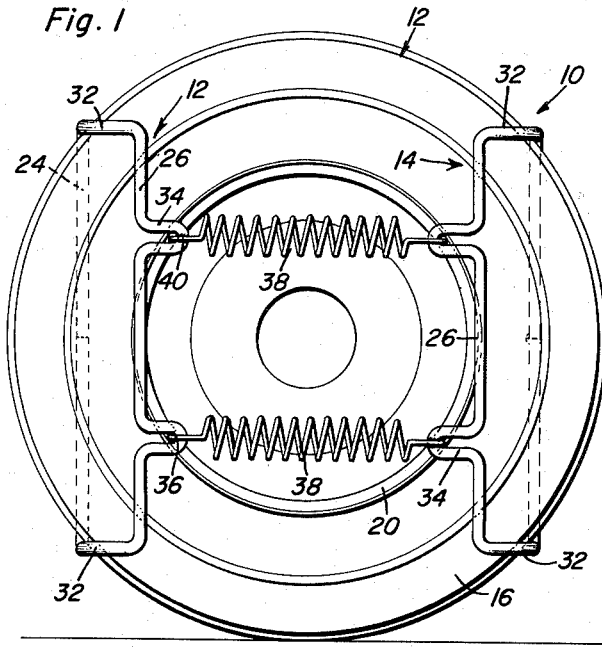
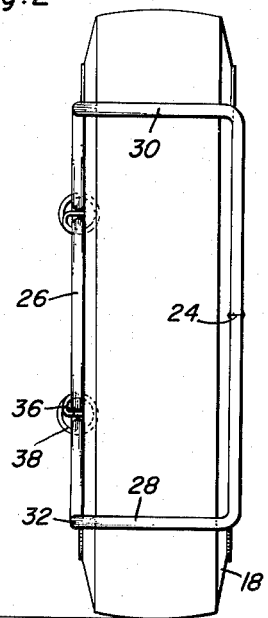
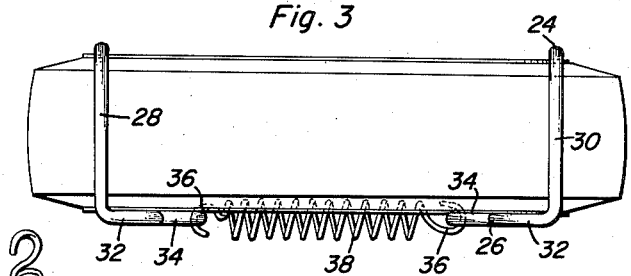
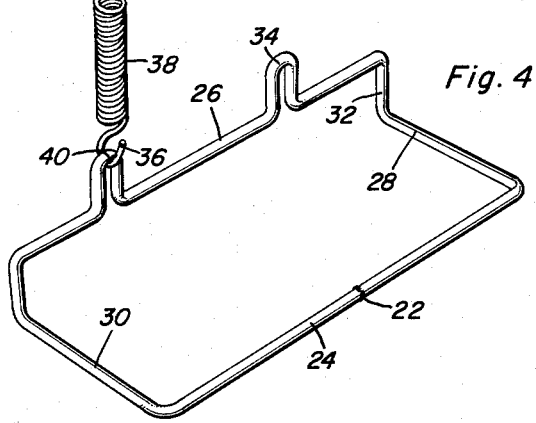
Richard P. Aler
INVENTOR.

United States Patent Office 3,198,233
Patented Aug. 3, 1965

3,198,233
WHEEL TRACTION AID DEVICE
Richard P. Aler, Baltimore, Md., assignor to A.G.S. Development & Sales Corporation, Baltimore, Md., a corporation of Maryland
Filed Feb. 1, 1963, Ser. No. 255,544
2 Claims. (Cl. 152—218)

The present invention generally relates to a wheel traction aid device especially adapted for vehicle wheels having a pneumatic tire thereon such as those normally employed on various types of road vehicles such as automobiles, trucks, buses and the like.

As is well known, numerous devices have been provided for endeavoring to assist in wheel traction. While such devices are effective to a certain extent, the present invention has for one of its objects the provision of a wheel traction aid which is extremely simple to install and does not require any special tools or implements and is of such simplicity in construction that the average motorist can install the device in a matter of seconds. Correspondingly, the device may be easily removed in a very short time thereby enabling the wheel traction aid to be placed in position when desired and then easily removed when the roadway being traversed no longer requires the use of a traction aid device.

Another object of the present invention is to provide a vehicle wheel traction aid having a pair of twin generally rectangular open members formed of a continuous rod with one elongated side of the open rectangular member being offset in relation to the other elongated side. The sides of each rectangular member are, of course, spaced apart from each other for positioning against opposite sides of a wheel whereby the elongated sides engage the tire at spaced pressure points with the pressure points on one side of the tire being spaced from the pressure points on the other side of the tire in a manner to prevent the rectangular member from pivoting or rocking on the wheel.

Still another object of the present invention is to provide a wheel traction aid device consisting of identical twin parts of open rectangular configuration which receive therein a segment of the periphery of the tire thereby enabling the device to be used with various diameter tires. The width of the rectangular member may vary in order to accommodate different tire widths. Further, the device may be readily stored in the trunk compartment of an automobile in a convenient manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a tire with the wheel traction aid device of the present invention installed thereon;

FIGURE 2 is a rear view of the tire and traction device assembled thereon;

FIGURE 3 is a top view of the assembly of FIGURE 1; and

FIGURE 4 is a perspective view of one of the twin devices which cooperate to form the traction aid device.

Referring now specifically to the drawings, the numeral 10 generally designates a wheel traction aid device mounted on a conventional vehicle wheel 11 and including a pair of identical open rectangular members generally designated by numerals 12 and 14 respectively. The wheel assembly is conventionally constructed and employs the usual pneumatic tire 16 having inclined side walls 18 mounted on the usual rim 20. In some installations, it may be necessary to remove the hub cap or wheel disk depending upon how far it projects laterally outwardly of the tire. If it is recessed, the wheel traction aid of the present invention may be installed without removing the hub cap or wheel disk cover.

Each open rectangular member is constructed of a continuous rod-like member having the ends thereof welded as at 22 and including an inner elongated member 24 and an outer elongated member 26. Interconnecting the elongated members 24 and 26 is a pair of end members 28 and 30. The inner end of each of the end members 28 and 30 is provided with an offset connecting portion 32 which is perpendicular to the end members 28 and 30 respectively and also perpendicular to the elongated member 26. The elongated member 26 is provided with a pair of U-shaped offset portions 34 which form hooks or crotches for reception of end loops or hooks 36 on tension springs 38. Each of the tension springs 38 has a hook on each end thereof and one of the hooks 36 is permanently secured to the U-shaped portion or crotch 34 by welding 40 or the like. Thus, each of the rectangular members 12 and 14 is identical in that each of the rectangular members 12 and 14 has a spring 38 permanently secured thereto. Thus, the members 12 and 14 are identical and are twin parts.

When installing the device on the tire 16, one of the rectangular members 12 is placed on the forward portion of the tire with the elongated member or portion 24 extending across the inner surface of the side wall of the tire and the elongated member or portion 26 extending across the outer surface of the tire side wall somewhat in the nature of a chord of a segment of the tire. The other rectangular member 14 is placed on the rear of the tire in the same manner and in general parallel alignment with the rectangular member 12. One of the springs 38 is then grasped and extended so that the free hook 36 thereof is engaged with the aligned U-shaped crotch or hook 34. Then, the second spring is extended and engaged with the U-shaped crotch 34 in alignment therewith. The springs 38 are manually operable with the spring tension being sufficient to hold the rectangular members 12 and 14 in place but not being sufficient to make it too difficult to expand by a motorist. In fact, even women drivers with average strength can easily place the wheel traction aid of the present invention on the tire.

The end members 28 and 30 extend across the tread face of the tire and the offset portion 32 disposes the side member 26 inwardly of the tire a greater radial distance than the side member 24. Thus, the point of engagement between the side member 24 and the inner side wall of the tire 16 will be disposed outwardly radially of the tire as compared with the points of engagement between the side member 26 and the outer side wall of the tire 16. Further, the pressure points between the side member 24 and the inner side wall of the tire will be disposed inwardly of the pressure points between the outer side wall of the tire and the outer side member 26 thus forming pressure points which are both radially spaced from each other and also spaced longitudinally of the length of the rectangular member.

The springs 38 are calibrated to enable the easy elongation thereof for installation of the members 12 and 14. Also, the points of connection between the springs 38 and the members 12 and 14 serve to lock the pressure points on the tire and the arrangement of the pressure points prevents canting of the rectangular members.

In use, very little noise and vibration is produced by the device since the flexibility of the tire enables the end members to engage a supporting surface and move upwardly into the tread surface of the tire a slight amount. A ⅜ inch rod structure has been found adequate to increase the traction by actually breaking the vacuum between the tire and road surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a wheel traction aid device an open rectangular member adapted to be used with a similar opposed member and resiliently connected therewith, said open rectangular member including a straight rod-like inner side, a pair of end members of rod-like construction unitarily formed with the inner side and extending perpendicular in relation thereto with the two end members being disposed in the same plane and free of obstructions, the outer end of each end member including an offset portion in perpendicular relation thereto with both offset portions lying in the same plane perpendicular to the plane of the end members, an outer side interconnecting the ends of the offset portions of the end members and being substantially parallel with the inner side but spaced laterally in relation thereto, said outer side having a pair of U-shaped crotch members formed therein with the U-shaped crotch members opening toward the plane of the end members, said crotch members being disposed in perpendicular relation to the outer side and disposed in the same plane as the outer side and in the same plane as the offset end portions, and a coil spring having hook ends, one hook end of the coil spring being disposed in and rigidly affixed to one of said U-shaped crotch members formed on the outer side and extending in perpendicular relation to the outer side and generally in alignment with the U-shaped crotch members.

2. In a wheel traction aid device an open rectangular member adapted to be used with a similar opposed member and resiliently connected therewith, said open rectangular member including a straight rod-like inner side, a pair of end members of rod-like construction unitarily formed with the inner side and extending perpendicular in relation thereto with the two end members being disposed in the same plane and free of obstructions, the outer end of each end member including an offset portion in perpendicular relation thereto with both offset portions lying in the same plane perpendicular to the plane of the end members, an outer side interconnecting the ends of the offset portions of the end members and being substantially parallel with the iner side but spaced laterally in relation thereto, a pair of coil spring members connected to the outer side, the outer side having means spaced longitudinally from the center thereof and spaced from the offset portions for positioning the coil spring members, the end of at least one coil spring member being permanently secured to the outer side, each coil spring member having hooked-shaped ends engaged with said outer side, said means on the outer side limiting longitudinal movement of the hook-shaped ends in relation to the outer side.

References Cited by the Examiner

UNITED STATES PATENTS

| 2,669,274 | 2/54 | Mullan | 152—223 |
| 2,867,259 | 1/59 | Barron. | |
| 3,073,370 | 1/63 | Frank | 152—218 |

FOREIGN PATENTS

| 830,563 | 5/38 | France. |

ARTHUR L. LA POINT, *Primary Examiner.*